(12) United States Patent
Lu et al.

(10) Patent No.: US 11,987,895 B2
(45) Date of Patent: May 21, 2024

(54) MODIFICATION METHOD OF ANODE FOR HYDROGEN PRODUCTION VIA ELECTROLYSIS, ANODE FOR HYDROGEN PRODUCTION VIA ELECTROLYSIS AND USE

(71) Applicant: NINGBO INSTITUTE OF MATERIALS TECHNOLOGY AND ENGINEERING, CHINESE ACADEMY OF SCIENCES, Ningbo (CN)

(72) Inventors: Zhiyi Lu, Ningbo (CN); Zhongfeng Wang, Ningbo (CN); Wenwen Xu, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 18/272,111

(22) PCT Filed: Aug. 17, 2022

(86) PCT No.: PCT/CN2022/113046
§ 371 (c)(1),
(2) Date: Jul. 13, 2023

(87) PCT Pub. No.: WO2023/226207
PCT Pub. Date: Nov. 30, 2023

(65) Prior Publication Data
US 2024/0084465 A1     Mar. 14, 2024

(30) Foreign Application Priority Data
May 25, 2022   (CN) .......................... 202210578543.6

(51) Int. Cl.
*C25B 11/081*     (2021.01)
*C25B 1/04*       (2021.01)
*C25B 11/031*     (2021.01)

(52) U.S. Cl.
CPC .............. *C25B 11/081* (2021.01); *C25B 1/04* (2013.01); *C25B 11/031* (2021.01)

(58) Field of Classification Search
CPC ........ C25B 11/081; C25B 1/04; C25B 11/031
See application file for complete search history.

(56) References Cited

FOREIGN PATENT DOCUMENTS

| CN | 110280269 A | 9/2019 |
| CN | 111774073 A | 10/2020 |
| CN | 114045515 A | 2/2022 |
| CN | 114351165 A | 4/2022 |
| CN | 114525540 A | 5/2022 |
| CN | 114774965 A | 7/2022 |
| WO | 0060138 A1 | 10/2000 |

OTHER PUBLICATIONS

Lu Zhiyi et al., CN114774965A Modification method of electrolytic hydrogen production anode, electrolytic hydrogen production anode and application, Jul. 2022.*

Shujie Liu, et al., Atomically embedded Ag on transition metal hydroxides triggers the lattice oxygen towards sustained seawater electrolysis, Nano Energy, 2022, pp. 1-9, vol. 98, 107212.

Soressa Abera Chala, et al., Site Activity and Population Engineering of NiRu-Layered Double Hydroxide Nanosheets Decorated with Silver Nanoparticles for Oxygen Evolution and Reduction Reactions, ACS Catalysis, 2019, pp. 117-129, vol. 9.

\* cited by examiner

*Primary Examiner* — Jafar F Parsa
(74) *Attorney, Agent, or Firm* — Bayramoglu Law Offices LLC

(57) ABSTRACT

A modification method of an anode for hydrogen production via electrolysis, the anode for hydrogen production via electrolysis and use thereof are provided. The modification method of the anode for hydrogen production via electrolysis includes providing an anode substrate which can be used for hydrogen production via catalytic electrolysis; and depositing a plurality of silver nano particles on the active surface of the anode substrate to form a silver nano layer, wherein gaps are present between the silver nano particles, and a part of the active surface is exposed from the gaps. In the modification method provided by the present application, the silver nano layer covers on the surface of the anode substrate, and chlorine ions are adsorbed onto the surface of silver in the process of hydrogen production via electrolysis to form a chlorine removal layer.

4 Claims, 6 Drawing Sheets

MODIFICATION METHOD OF ANODE FOR HYDROGEN PRODUCTION VIA ELECTROLYSIS, ANODE FOR HYDROGEN PRODUCTION VIA ELECTROLYSIS AND USE

CROSS REFERENCE TO THE RELATED APPLICATIONS

This application is the national phase entry of International Application No. PCT/CN2022/113046, filed on Aug. 17, 2022, which is based upon and claims priority to Chinese Patent Application No. 202210578543.6, filed on May 25, 2022, the entire contents of which are incorporated herein by reference.

TECHNICAL FIELD

The present application relates to the technical fields of materials and energy catalysis, in particular to a modification method of an anode for hydrogen production via electrolysis, the anode for hydrogen production via electrolysis and use.

BACKGROUND

The overuse of traditional fossil energy has resulted in serious energy shortage and environment pollution problems, so it is urgent to develop and utilize a clean and renewable new energy to deal with the energy shortage and environment pollution problems. Efficient electro-catalytic overall water decomposition is expected to alleviate the increasingly serious energy shortage.

Oxygen production via water electrolysis is an oxygen production technology that is efficient, clean and low in cost. However, the shortage and imbalanced distribution of fresh water resources restrict the large-scale commercial application of this technology.

However, under an alkaline condition, the dynamics of oxygen evolution reaction (OER) is relatively slow, and the durability of a catalyst is relatively poor. Although the catalysts such as RuO and IrO have been utilized as an anode for electrolysis, it is urgent to develop an OER catalyst that is high in activity, good in stability, low in cost and rich in reserves.

Prior to the previous study, a series of OER catalysts in the alkaline solution have been developed, including metal oxides, sulfides and phosphides. However, seawater electrolysis does not reach long-term stability under industrial current density. Due to a similarity to a catalytic mechanism of hydrogenase, the phosphide generally shows good hydrogen evolution reaction (HER) activity, however, its OER activity is not satisfactory. Hence, it is urgent to develop an efficient and stable catalyst for oxygen production via water electrolysis as an anode.

A chlorine ion-containing aqueous solution, especially a large number of chlorine ions in seawater, can cause the serious corrosion of the electrode and the shortened service life of the electrode. Therefore, it is urgent to develop a catalyst for oxygen evolution via seawater electrolysis, which is efficient, stable and low in cost, to boost the development of a hydrogen production technology via seawater electrolysis.

For example, some non-notable metal catalysts for oxygen evolution, NiFe-LDH, have been widely reported and researched due to the characteristics of excellent property and low cost, however, they are easily corroded by chlorine ions in seawater, restricting the application thereof in the chlorine ion-containing aqueous solution, especially in hydrogen production via seawater electrolysis.

SUMMARY

In view of the defects in the prior art, the objective of the present application is to provide a modification method of an anode for hydrogen production via electrolysis, the anode for hydrogen production via electrolysis and use.

To realize the objective of the foregoing invention, the technical solution adopted in the present application includes:

In a first aspect, the present application provides a modification method of an anode for hydrogen production via electrolysis, comprising:

providing an anode substrate which can be used for hydrogen production via catalytic electrolysis; and depositing a plurality of silver nano particles on the active surface of the anode substrate to form a silver nano layer, where gaps are present between the silver nano particles, and a part of the active surface is exposed from the gaps.

Further, the silver nano particle is lamellar, and has a particle size of 10-30 nm.

Further, the size of the gap is 100-300 nm, and the surface density of the silver nano particle in the silver nano layer is 200-500/$\mu m^2$.

In a second aspect, the present application further provides an anode for hydrogen production via electrolysis prepared by the above modification method, where the anode for hydrogen production via electrolysis includes an anode substrate and a silver nano layer coating on the at least active surface of the anode substrate;

the anode substrate itself can be used for hydrogen production via electrolysis, the silver nano layer includes a plurality of silver nano particles, there are gaps among the silver nano particles, and a part of the active surface is exposed from the gaps.

In a third aspect, the present application further provides use of the above anode for hydrogen production via electrolysis in hydrogen production via electrolysis in a chlorine ion-containing aqueous solution.

Based on the above technical solution, compared with the prior art, the present application at least includes the following beneficial effects:

a silver nano layer covers on the surface of the anode substrate, and chlorine ions are adsorbed onto the surface of silver in the process of hydrogen production via electrolysis to form a chlorine removal layer to hinder the further adsorption of other chlorine ions in the solution onto the surface of an electrode, so as to achieve the effect of delaying the corrosion of chlorine ions on the anode, and the proper silver nano layer structure does not greatly affect the catalysis of the anode substrate, thereby improving the stability and selectivity of the anode in the reaction of hydrogen production via seawater electrolysis.

The above description is only summary of the technical solution of the present application. To enable those skilled in the art to more clearly understand the technical means of the present application and to perform implementation according to the content of the specification, the detailed description will be made with reference to preferred embodiments of the present application in combination with accompanying drawings.

DETAILED DESCRIPTION OF THE EMBODIMENTS

Figure 1:
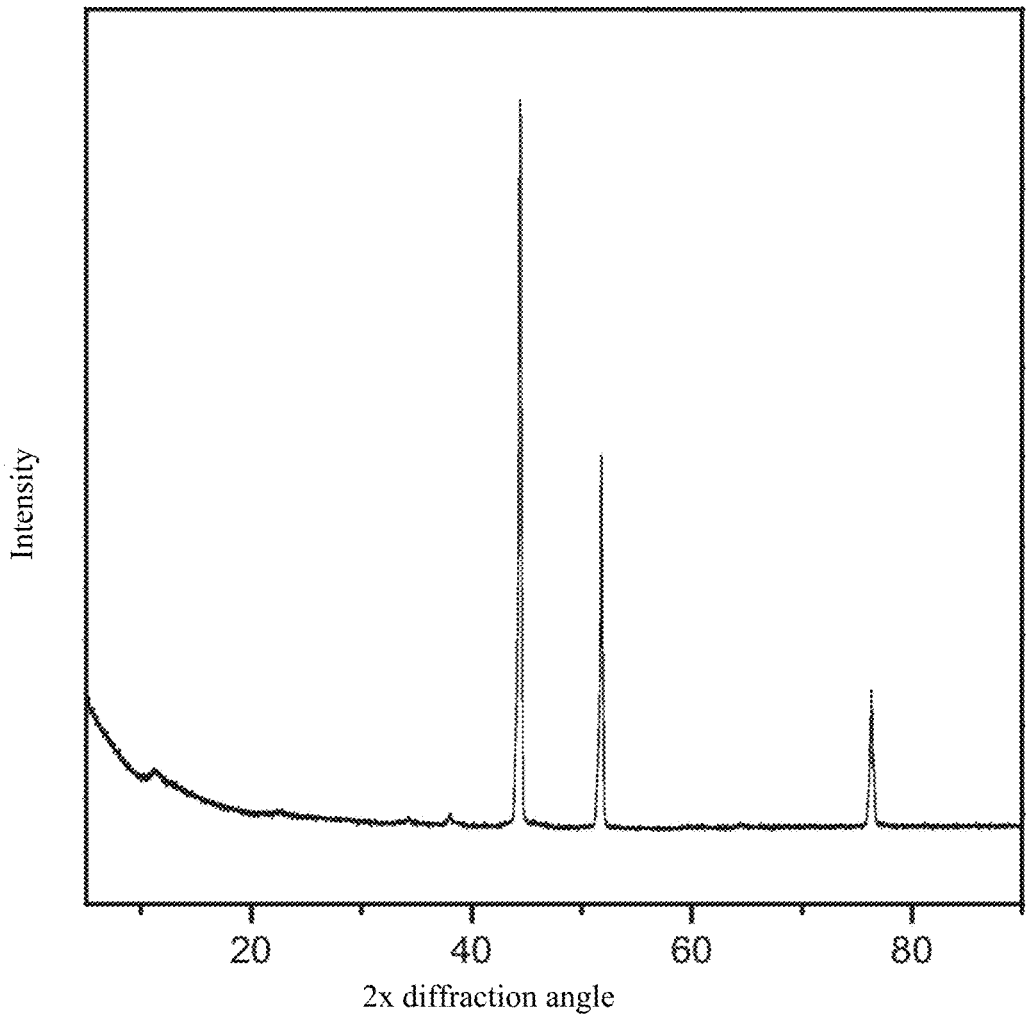
FIG. 1 is an X-ray diffraction pattern of an anode for hydrogen production via electrolysis according to a typical example of the present application.

In view of the defects in the prior art, by long-term researches and lots of practices, the inventor of this case proposes the technical solution of the present application. Next, the technical solution, its implementation process and principle will be further explained and illustrated.

Many details will be set forth in the description below to facilitate the full understanding of the present application, however, the present application can also be implemented by means of other modes different from that in this description, and therefore the protective scope of the present application is not limited by specific embodiments disclosed hereafter.

Furthermore, relational terms such as "first" and "second" are only for distinguishing one component or one method step from another component with the same name or another method step, and it is necessary to require or imply that there is an any actual relationship or order between these components or method steps.

The present application provides an electrode modification method for improving the stability of an anode for seawater electrolysis, thereby providing a new idea for the stability of the anode in the process of hydrogen production via seawater electrolysis.

The embodiment of the present application provides a modification method of an anode for hydrogen production via electrolysis, including the following steps:

providing an anode substrate which can be used for hydrogen production via catalytic electrolysis; and depositing a plurality of silver nano particles on the active surface of the anode substrate to form a silver nano layer, where gaps are present between the silver nano particles, and a part of the active surface is exposed from the gaps.

As some typical application examples, an organic solvent is used as a solvent for a solvothermal method, a densely coated catalyst as the anode substrate is slowly grown in situ on a conductive substrate, subsequently a certain amount of silver is electroplated thereon, the anode catalyst prepared has an excellent property of evolving oxygen from seawater via electrolysis and an ability of resisting chlorine corrosion.

Where, the selected anode substrate itself has a certain seawater oxygen evolution activity and selectivity, and therefore it can be used for hydrogen production via catalytic electrolysis.

In the process of hydrogen production via electrolysis, chlorine ions can preferably adsorbed onto the surface of the above silver nano particle, and then a chlorine removal layer is formed to hinder other chlorine ions in the solution to be further adsorbed onto the surface of the electrode, thereby achieving the effect of delaying the corrosion of chlorine ions on the anode, and the proper silver nano layer structure, especially the above gaps, make the active surface of the above anode substrate exposed, thus the inherent catalysis of the anode substrate is not greatly affected.

Of course, the above technical solution further includes: after the anode for hydrogen production via electrolysis is prepared, material characterization and selectivity and stability test are performed on the anode. These steps are intended for quality control or deep research, regardless of whether or not characterization is carried out and by what means, all fall within the protective scope of protection of the present application. The material characterization of the modified anode can include but is not limited to: X-ray diffraction (XRD) and X-ray photoelectron spectroscopy (XPS) characterization are carried out to determine the characteristics of the coated material; characterization is carried out on material morphology, lattices and element contents via scanning electron microscope (SEM), transmission electron microscope (TEM); the selectivity and stability characterization of the modified anode includes but is not limited to: linear sweep voltammetry (LSV) and i-t constant current test.

Figure 2:
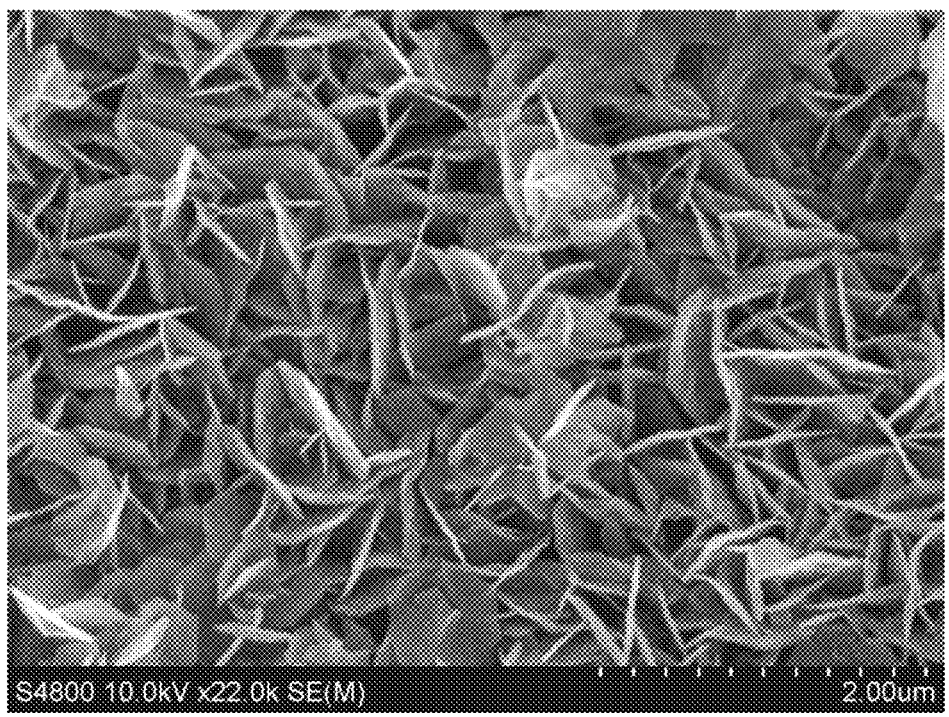
FIG. 2 is a scanning electron microscope picture of a surface morphology of an anode for hydrogen production via electrolysis according to a typical example of the present application.
Figure 3:
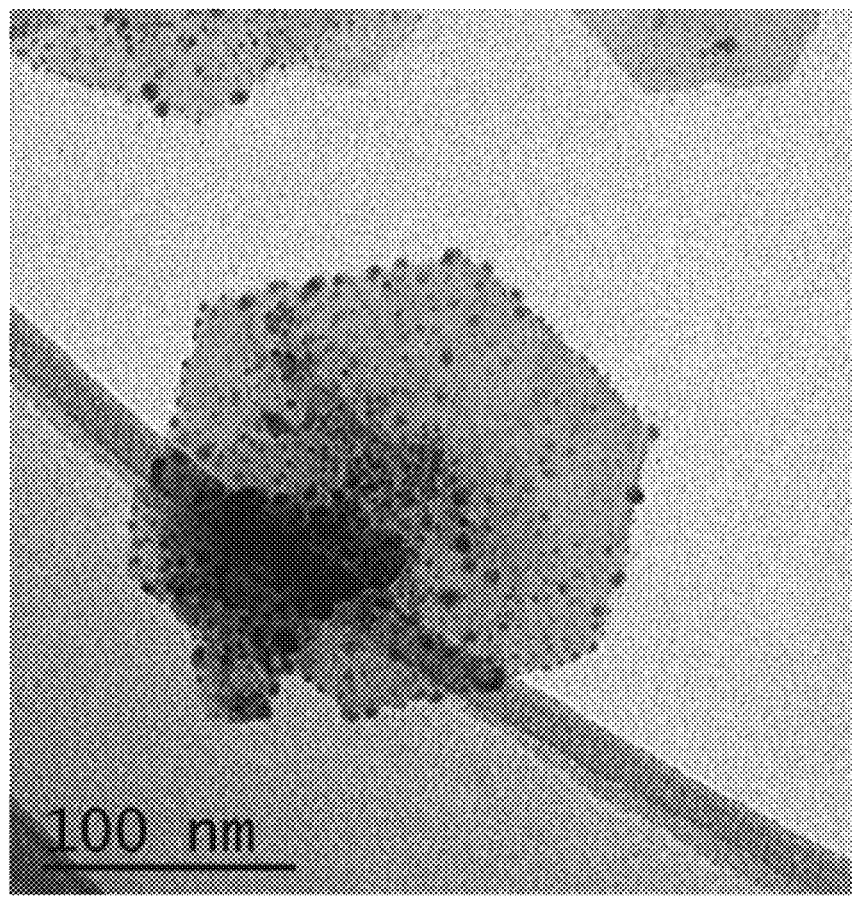
FIG. 3 is a scanning transmission electron microscope picture of an anode for hydrogen production via electrolysis according to a typical example of the present application.
Figure 4:
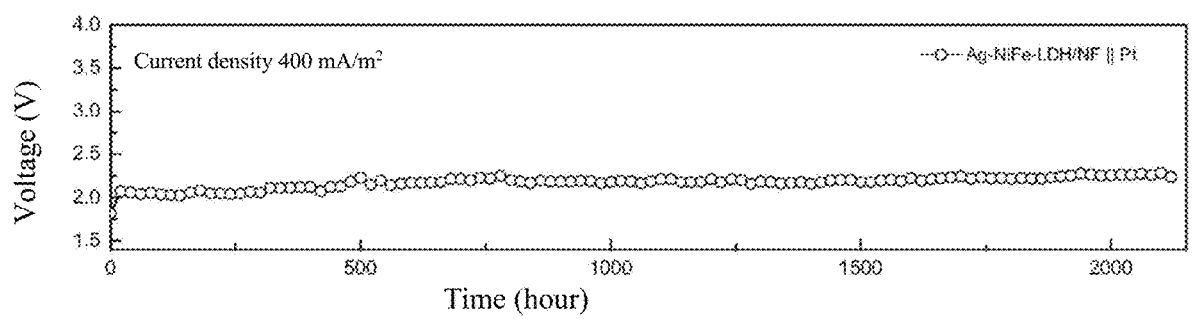
FIG. 4 is an electrolysis stability test diagram of an anode for hydrogen production via electrolysis according to a typical example of the present application.
Figure 7:
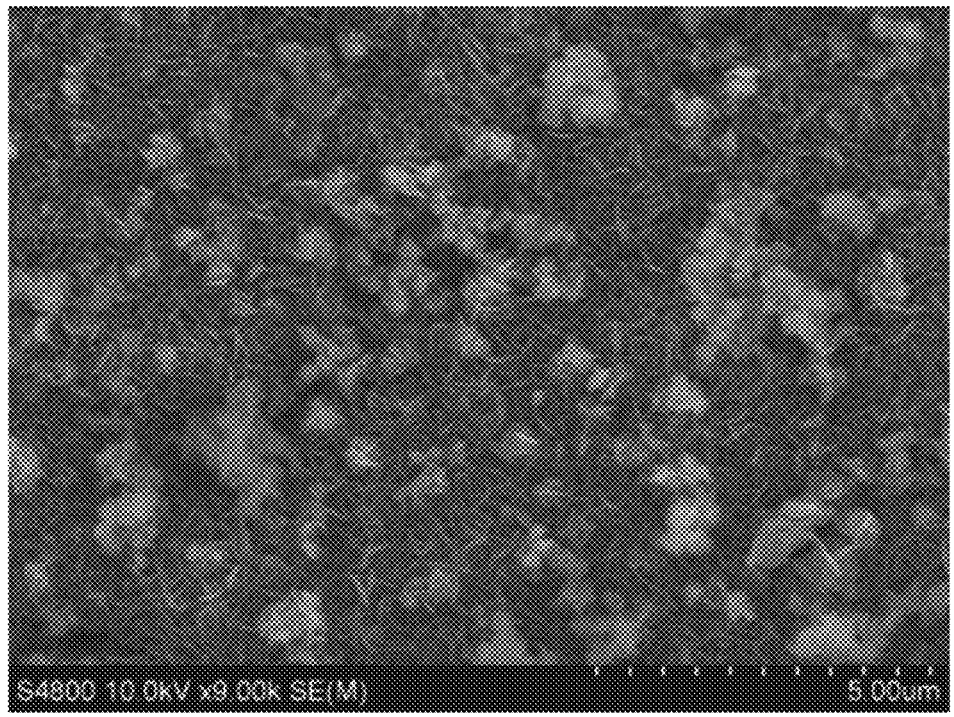
FIG. 7 is a scanning electron microscope picture of surface morphology of an anode for hydrogen production via electrolysis according to a yet typical example of the present application.
Figure 8:
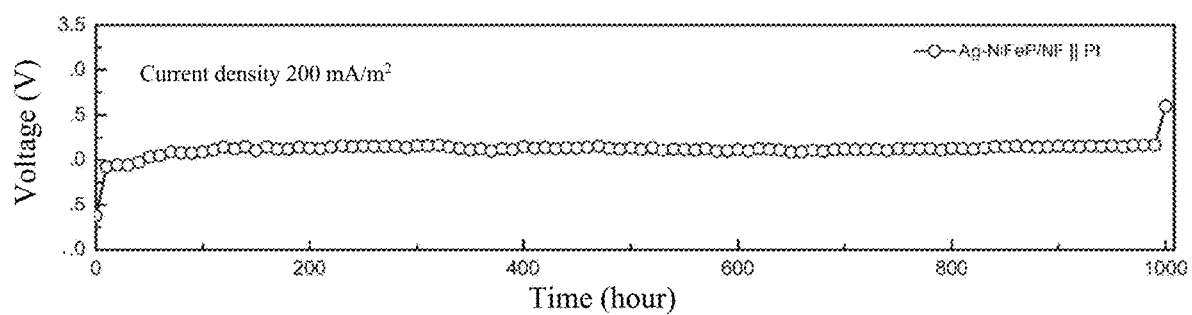
FIG. 8 is an electrolysis stability test diagram of an anode for hydrogen production via electrolysis according to a yet typical example of the present application.

In some embodiments, referring to FIG. 2, FIG. 3 and FIG. 7, the silver nano particles are preferably distributed on laminar anode substrate particles, and a particle size can be preferably 10-30 nm.

In some embodiments, the size of the gap can be selected in a range of 100-300 nm, preferably about 300 nm, the surface density of the silver nano particles in the silver nano layer can be selected in a range of 200-500 $\mu m^2$, preferably about 450 $\mu m^2$.

The inventor finds that the characteristics of the above silver nano layer such as morphology, particle size, gap size and gap rate are key characteristics that do not create negative effects on effective chlorine removal and catalytic efficiency. If such the characteristics are to be formed, there is a need to uniquely design process parameters for depositing the above silver nano layer to the above special morphology, such as the concentration of the electroplating solution and electroplating time during the electroplating deposition, or the vapor plating power, vapor plating time and other parameters during the vapor plating. Only by setting an appropriate deposition process can the morphology of the above special silver nano layer be formed.

In some embodiments, the anode substrate includes a combination of any one or more than two of hydroxides, oxides, phosphides and sulfides. It can be an electrode composed of the above materials alone, or a composite electrode formed by combining the above materials or a combination thereof with other materials such as a conducting agent, a surface composite phosphate coating or other plating coatings, or formed substrates to form a special shape.

In some embodiments, included is multiple silver nano particles are deposited on the active surface of the anode substrate by using any one of an electroplating method, an electroless plating method and a vapor plating method. The deposition method can be selected depending on the characteristics of the above anode substrate, for example coating silver via electroplating does not affect the intrinsic property of the anode catalyst in step (1) and suitable for various classes of anode electrodes. Coating silver via electroplating comprises placing an electrode material in an electrolyte, electrifying to reduce the silver ions in the solution onto the surface of the electrode. Coating silver via electroless plating is suitable for materials that are prone to dehydration at high temperature, such as hydroxides, comprises the following steps: pretreatment of an electrode, preparation of an electrolyte, construction of an electroplating device and setting of electroplating parameters and posttreatment of the electrode after electroplating is finished. Through the method, silver can be uniformly and firmly grown on the surface of the electrode. Coating silver via vapor plating is capable of fast and uniformly performing silver coating on the anode in large area, however, the vapor plating is generally carried out at 100-400° C. Thus, the vapor plating method is not suitable for materials that are prone to dehydration at high temperature, such as hydroxides, and comprises the steps: pretreatment of an electrode, setting of electroplating parameters and installation of the electrode.

In some embodiments, the electroplating solution used in the electroplating method comprises a silver salt, a complexing agent and an alkaline substance.

In some embodiments, the silver salt comprises silver nitrate.

In some embodiments, the concentration of the silver salt in the electroplating solution is 0.01-0.06 mol/L.

In some embodiments, the complexing agent comprises a combination of any one or two of sodium pyrophosphate or potassium pyrophosphate.

In some embodiments, the concentration of the complexing agent in the electroplating solution is 0.05-0.20 mol/L.

In some embodiments, the alkaline substance comprises sodium hydroxide or potassium hydroxide.

In some embodiments, the concentration of the alkaline substance in the electroplating solution is 0.2-1.0 mol/L.

In some embodiments, the current density used in the electroplating method is 3-10 $mA/cm^2$.

In some embodiments, the electroplating method is a constant current mode.

In some embodiments, the electroplating time is 3-15 min.

It can be seen that the above preferred electroplating methods are different from the traditional silver electroplating method, the silver salt concentration, current density and electroplating and the like are all different from those of the traditional silver electroplating method, which are modifications made for forming the above special silver nano layer structure.

In some embodiments, an electroless plating solution used in the electroless plating method comprises a silver salt, a reducing agent and a stabilizer.

In some embodiments, the silver salt includes silver sulfate, silver nitrate or a combination thereof, but is not limited thereto. Other common silver salts for electroless plating silver can also be used. The reducing agent includes glucose, sodium borohydride or a combination thereof, but is not limited thereto. The stabilizer includes ammonia, tartaric acid, and sodium hydroxide, or a combination of two or more of them.

Application of which electroless plating reagents is not a core of the present application. The core of the present application is to achieve the above special silver nano layer structure through the control of reaction conditions by utilizing electroplating or electroplating or vapor plating, and then realize the protection of the anode.

In some embodiments, the concentration of the silver salt is 0.01-0.1 mol/L, the concentration of the reducing agent is 0.1-0.5 mol/L, and the concentration of the stabilizer is 0.2-0.6 mol/L.

In some embodiments, the electroless plating temperature is 20-25° C., and the electroless plating time is 5-10 minutes.

In some embodiments, the vapor plating method is carried out by magnetron sputtering.

In some embodiments, the magnetron sputtering power is 150-250 $W/cm^2$, and the magnetron sputtering time is 5-10 s.

In the vapor plating method, the time should be strictly controlled to achieve the above silver nano layer structure.

Referring to FIG. 1-FIG. 8, the embodiment of the present application further provides an anode for hydrogen production via electrolysis. The anode for hydrogen production via electrolysis comprises an anode substrate and a silver nano layer coating on the at least active surface of the anode substrate; the anode substrate itself can be used for hydrogen production via electrolysis, the silver nano layer comprises multiple silver nano particles, gaps are present between the silver nano particles, and a part of the active surface is exposed from the gaps.

In some embodiments, the thickness of the silver nano layer is 5-20 nm.

The above anode for hydrogen production via electrolysis can be prepared by the modification method provided above, or other methods. The anodes for hydrogen production via electrolysis should be included within the protective scope of the present application as long as they have the same structure features, which can also have the same morphology, size gap and other characteristics as those of the silver nano layer.

The embodiment of the present application further provides use of the above anode for hydrogen production via electrolysis in hydrogen production via electrolysis in a chlorine ion-containing aqueous solution. Of course, due to cost consideration, the optimal choice for the chloride ion-containing aqueous solution is seawater, but is not limited thereto, for example, industrial chlorine-containing wastewater, or a specially prepared sodium chloride or potassium chloride aqueous solution also falls within the protective scope of in the present application.

Next, the technical solution of the present application will be further described in detail through several embodiments in combination with accompanying drawings. However, the selected embodiments are only for the purpose of illustrating the present application, but not limiting the scope of the present invention.

Example 1

(1) Commercial foam nickel (as a conductive substrate) was cut into 1 cm×3 cm long strip, ultrasonically treated for 3 min in a 2 mol·$L^{-1}$ hydrochloric acid solution followed by ultrasonically washing three times in deionized water and anhydrous ethanol respectively, and then dried naturally in air for later use.

(2) 130.8 mg of nickel nitrate hexahydrate, 60.6 mg of iron nitrate trihydrate and 300 mg of urea were weighed and dissolved into 36 mL of deionized water to prepare a nickel iron-containing solvothermal reaction solution, and the above solution was transferred to a 50 mL polytetrafluoroethylene reaction tank.

Figure 5:
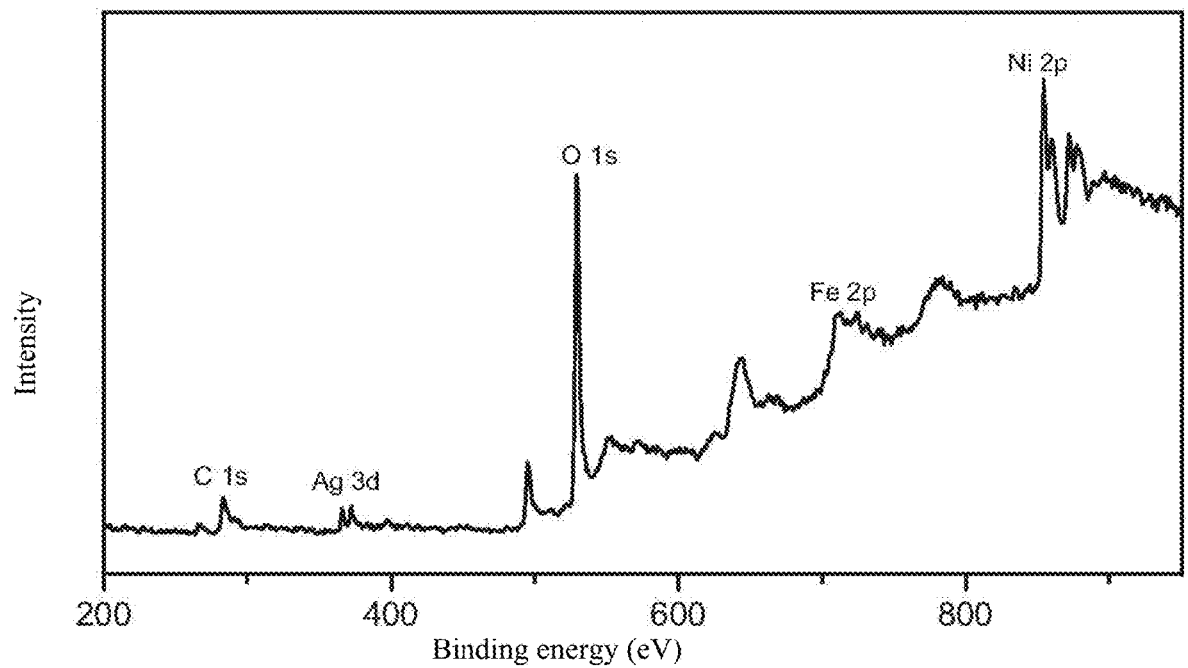
FIG. 5 is an X-ray photoelectron spectrogram of an anode for hydrogen production via electrolysis according to a typical example of the present application.

(3) The washed foam nickel was immersed into the reaction solution and subjected to solvothermal reaction for 12 h in a stainless steel high pressure reactor at 120° C. under the sealing condition, the reaction product was cooled and taken out, and then cleaned up with ultrapure water and ethanol, the cleaned product was dried for 12 h in an oven at 60° C. with air. The dried product was electroplated for 5 min under the current density of 5 mA/cm$^2$ to obtain a Ag@NiFe-LDH/NF high-stability oxygen evolution catalyst as an anode for electrolysis, the size of the nano silver particle on the surface of the anode is controlled jointly by electroplating current and electroplating time, and a preferred electroplating condition was electroplating for 5 min under the 5 mA/cm$^2$. The X-ray diffraction pattern of the NiFe-LDH anode is shown in FIG. 1, the surface morphology of the NiFe-LDH anode is shown in FIG. 2, a transmission electron microscopy (TEM) map of Ag@NiFe-LDH/NF is shown in FIG. 3 in which it can be observed that dark (black) dot-shaped silver particles are distributed on a light colored laminar catalyst structure. It is clear that the nano silver particles are uniformly distributed on the surface of the NiFe-LDH anode, with a particle size of approximately 10-30 nm. The XPS diagram is shown in FIG. 5.

(4) 40 g of sodium hydroxide and 29.22 g of sodium chloride solid were weighed and dissolved into 1 L of deionized water to prepare a 1 M NaOH+0.5 M NaCl simulated seawater solution as an electrolyte solution for later use.

(5) The stability of Ag@NiFe-LDH/NF was tested under the current density of 400 mA/cm$^2$ by using Ag@NiFe-LDH/NF prepared in step (3) as a working electrode, a platinum sheet as a pair electrode and simulated seawater in step (4) as an electrolyte. The results were shown in FIG. 4. It could be seen from the scanning picture that the Ag@NiFe-LDH/NF anode closely covers on the surface of the foam nickel, silver particles were supported on the surface of the electrode in a mode of electroplating; the stability of the electrode prepared by this method in seawater electrolysis lasted for more than 2000 hours, which was about twenty times of that of NiFe-LDH/NF. It suggested that the Ag@NiFe-LDH/NF anode prepared by this method played a role in protecting the substrate.

Example 2

(1) Commercial foam nickel was cut into 1 cm×3 cm long strip, ultrasonically treated for 3 min in a 2 mol·L$^{-1}$ hydrochloric acid solution followed by ultrasonically washing three times in deionized water and anhydrous ethanol respectively, and then dried naturally in air for later use. The anode substrate NiFe-LDH/NF was prepared according to the same method in example 1.

(2) The parameter of magnetron sputtering was set as 300 W, the sputtering time was 10 s, and the vacuum degree of a vacuum cavity was adjusted to 0.3-5 pa.

(3) The dried NiFe-LDH/NF electrode sheet suspended in the vacuum cavity to undergo magnetron sputtering based on parameters in (2) to obtain a Ag@NiFe-LDH/NF high-stability oxygen evolution anode, the size of the sputtered silver particle was decided by the sputtering time, and the growth speed of the silver particle was controlled by the sputtering power, wherein preferred conditions were as follows: the sputtering power was 300 W, and the sputtering time was 10 s.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@NiFe-LDH/NF was tested under the current density of 200 mA/cm$^2$ by using Ag@NiFe-LDH/NF prepared in step (3) as a working electrode, a platinum sheet as a pair electrode and simulated seawater in step (4) as an electrolyte. The results were shown in FIG. 6. The stability of the electrode prepared by this method lasted for more than 200 hours in seawater electrolysis, which suggested that the Ag@NiFe-LDH/NF anode prepared by this method played a role in protecting the substrate.

Example 3

(1) Commercial foam nickel was cut into 1 cm×3 cm long strip, ultrasonically treated for 3 min in a 2 mol·L$^{-1}$ hydrochloric acid solution followed by ultrasonically washing three times in deionized water and anhydrous ethanol respectively, and then dried naturally in air for later use.

(2) 130.8 mg of nickel nitrate hexahydrate, 60.6 mg of iron nitrate trihydrate and 300 mg of urea were weighed and dissolved into 36 mL of deionized water to prepare a nickel iron-containing solvothermal reaction solution, and the above solution was transferred to a 50 mL polytetrafluoroethylene reaction tank.

(3) The washed foam nickel was immersed into the reaction solution and subjected to solvothermal reaction for 12 h in a stainless steel high pressure reactor at 120° C. under the sealing condition, the reaction product was cooled and taken out, and then cleaned up with ultrapure water and ethanol, the cleaned product was dried for 12 h in an oven at 60° C. with air. Subsequently, the above electrode was soaked into a commercial chemical soaking silver plating solution for 10 minutes to obtain a Ag@NiFe-LDH/NF high-stability oxygen evolution anode.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@NiFe-LDH/NF was tested under the current density of 200 mA/cm$^2$ by using Ag@NiFe-LDH/NF prepared in step (3) as a working electrode, a platinum sheet as a pair electrode and simulated seawater in step (4) as an electrolyte. The stability of the electrode prepared by this method lasted for more than 200 hours in seawater electrolysis, which suggested that the Ag@NiFe/NF anode prepared by this method played a role in protecting the substrate.

Example 4

(1) Commercial foam nickel was cut into 1 cm×3 cm long strip, ultrasonically treated for 3 min in a 2 mol·L$^1$ hydrochloric acid solution followed by ultrasonically washing three times in deionized water and anhydrous ethanol respectively, and then dried naturally in air for later use.

(2) 130.8 mg of nickel nitrate hexahydrate, 60.6 mg of iron nitrate trihydrate and 300 mg of urea were weighed and dissolved into 36 mL of deionized water to prepare a nickel iron-containing solvothermal reaction solution, and the above solution was transferred to a 50 mL polytetrafluoroethylene reaction tank.

Figure 6:
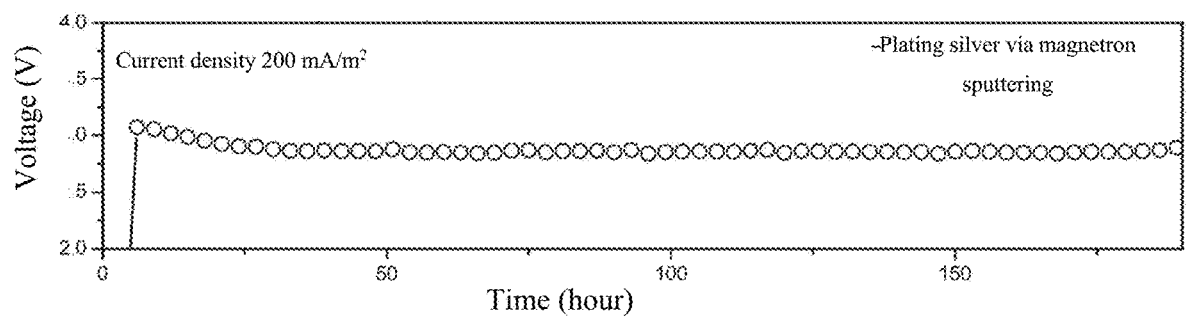
FIG. 6 is an electrolysis stability test diagram of an anode for hydrogen production via electrolysis according to another typical example of the present application.

(3) The washed foam nickel was immersed into the reaction solution and subjected to solvothermal reaction for 12 h in a stainless steel high pressure reactor at 120° C. under the sealing condition, the reaction product was cooled and taken out, and then cleaned up with ultrapure water and ethanol, the cleaned product was dried for 12 h in an oven at 60° C. with air. Subsequently, phosphating was carried out, and finally the dried product was electroplated for 5 min under the current density of 5 mA/cm$^2$ to obtain a Ag@NiFeP/NF high-stability oxygen evolution anode. The scanning picture is shown in FIG. 6.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@NiFeP/NF was tested under the current density of 200 mA/cm$^2$ by using Ag@NiFeP/NF prepared in step (3) as a working electrode, a platinum sheet as a pair electrode and high-concentration simulated seawater in step (4) as an electrolyte. The results were shown in FIG. 8. It could be seen from the scanning picture that the Ag@NiFeP/NF anode closely covered on the surface of the foam nickel, silver particles were supported on the surface of the electrode in a mode of electroplating. The stability of the electrode prepared by this method lasted for more than 1000 hours in seawater electrolysis, and the NiFeP/NF anode could only operate for 300 hours, which suggested that the Ag@NiFeP/NF anode prepared by this method played a role in protecting the substrate.

Example 5

(1) Commercial foam nickel was cut into 1 cm×3 cm long strip, ultrasonically treated for 3 min in a 2 mol·L$^{-1}$ hydrochloric acid solution followed by ultrasonically washing three times in deionized water and anhydrous ethanol respectively, and then dried naturally in air for later use.

(2) 1.74 g of nickel nitrate hexahydrate and 0.8 g of cobalt nitrate hexahydrate were weighed and dissolved into 1 L of deionized water to prepare a nickel cobalt-containing electrodeposition plating solution, and then 200 mL of the above plating solution was placed in an electroplating tank.

(3) The washed foam nickel was immersed into an electroplating solution and then electroplated for 20 minutes at a voltage of −1V under a three-electrode system, then the electroplated NiCo-LDH/NF was dried for 12 h in an oven at 60° C. with air, and finally electroplated for 5 min under the current density of 5 mA/cm$^2$ to obtain a high-stability Ag@NiCo-LDH/NF oxygen evolution anode.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@NiCo-LDH/NF was tested under the current density of 200 mA/cm$^2$ by using Ag@NiCo-LDH/NF prepared in step (3) as a working electrode, a platinum sheet as a pair electrode and high-concentration simulated seawater in step (4) as an electrolyte. The stability of the electrode prepared by this method lasted for more than 500 hours in seawater electrolysis, whereas the NiCo-LDH/NF anode could only operate for 50 hours, which suggested that the Ag@NiCo-LDH/NF anode prepared by this method played a role in protecting the substrate.

Example 6

(1) Commercial foam nickel was cut into 1 cm×3 cm long strip, ultrasonically treated for 3 min in a 2 mol·L$^{-1}$ hydrochloric acid solution followed by ultrasonically washing three times in deionized water and anhydrous ethanol respectively, and then dried naturally in air for later use.

(2) 2.6 g of nickel nitrate hexahydrate and 5.4 g of cobalt nitrate hexahydrate were weighed and dissolved into 500 mL of deionized water to prepare a cobalt manganese-containing electrodeposition plating solution, and then 200 mL of the above plating solution was placed in an electroplating tank.

(3) The washed foam nickel was immersed into an electroplating solution and then electroplated for 2 minutes at a voltage of −1V under a three-electrode system, then the electroplated CoMn-LDH/NF was dried for 12 h in an oven at 60° C. with air, and finally electroplated for 5 min under the current density of 5 mA/cm$^2$ to obtain a Ag@CoMn-LDH/NF high-stability oxygen evolution anode.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@CoMn-LDH/NF was tested under the current density of 200 mA/cm$^2$ by using Ag@CoMn-LDH/NF prepared in step (3) as a working electrode, a platinum sheet as a pair electrode and high-concentration simulated seawater in step (4) as an electrolyte. The stability of the electrode prepared by this method lasted for more than 500 hours in seawater electrolysis, whereas the CoMn-LDH/NF anode could only operate for 100 hours, which suggested that Ag@CoMn-LDH/NF anode prepared by this method played a role in protecting the substrate.

Example 7

(1) Commercial foam nickel was cut into 1 cm×3 cm long strip, ultrasonically treated for 3 min in a 2 mol·L$^1$ hydrochloric acid solution followed by ultrasonically washing three times in deionized water and anhydrous ethanol respectively, and then dried naturally in air for later use.

(2) 5.4 g of manganese acetate and 5 g of sodium sulfate were dissolved into 500 mL of deionized water to prepare a manganese-containing electrodeposition plating solution, and then 200 mL of the above plating solution was placed in an electroplating tank.

(3) The washed foam nickel was immersed into an electroplating solution and then electroplated for 2 minutes at a voltage of −1V under a three-electrode system, then the electroplated Na|MnO$_2$/NF was dried for 12 h in an oven at 60° C. with air, and finally electroplated for 5 min under the current density of 5 mA/cm$^2$ to obtain a Ag@Na|MnO$_2$/NF high-stability oxygen evolution anode.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

(5) The stability of Ag@Na|MnO$_2$/NF was tested under the current density of 200 mA/cm$^2$ by using Ag@Na|MnO$_2$/NF prepared in step (3) as a working electrode, a platinum sheet as a pair electrode and high-concentration simulated seawater in step (4) as an electrolyte. The stability of the electrode prepared by this method lasted for more than 300 hours in seawater electrolysis, whereas the Na|MnO$_2$/NF anode could only operate for 60 hours, which suggested that Na|MnO$_2$/NF anode prepared by this method played a role in protecting the substrate.

Comparative Example 1

(1) Commercial foam nickel (as a conductive substrate) was cut into 1 cm×3 cm long strip, ultrasonically treated for 3 min in a 2 mol·L$^1$ hydrochloric acid solution followed by ultrasonically washing three times in deionized water and anhydrous ethanol respectively, and then dried naturally in air for later use.

(2) 130.8 mg of nickel nitrate hexahydrate, 60.6 mg of iron nitrate trihydrate and 300 mg of urea were weighed and dissolved into 36 mL of deionized water to prepare a nickel iron-containing solvothermal reaction solution, and the above solution was transferred to a 50 mL polytetrafluoroethylene reaction tank.

(3) The washed foam nickel was immersed into the reaction solution and subjected to solvothermal reaction for 12 h in a stainless steel high pressure reactor at 120° C. under the sealing condition, the reaction product was cooled and taken out, and then cleaned up with ultrapure water and ethanol, the cleaned product was dried for 12 h in an oven at 60° C. with air. The traditional commercial silver plating solution was used as an electroplating solution, and the Ag@NiFe-LDH/NF catalyst prepared by electroplating for 15 min at −1V was used as the anode for electrolysis.

(4) 40 g of sodium hydroxide and 29.22 g of sodium chloride solid were weighed and dissolved into 1 L of deionized water to prepare a 1 M NaOH+0.5 M NaCl simulated seawater solution as an electrolyte solution for later use.

(5) The stability of Ag@NiFe-LDH/NF was tested under the current density of 400 mA/cm$^2$ by using Ag@NiFe-LDH/NF prepared in step (3) as a working electrode, a platinum sheet as a pair electrode and high-concentration simulated seawater in step (4) as an electrolyte.

This comparative example is substantially similar to example 1, only except that the composition contents and electroplating process parameters of the electroplating solution used during the electroplating are different, and a continuous layer structure formed during the traditional electroplating is formed rather than the above particular silver nano layer structure.

Therefore, the electrode prepared by this method lasts for about 100 hours, which is close to that prior to silver plating. Furthermore, most of the active sites are lost after this method is used, thereby affecting the activity of the electrode.

Comparative Example 2

(1) Commercial foam nickel was cut into 1 cm×3 cm long strip, ultrasonically treated for 3 min in a 2 mol·L$^1$ hydrochloric acid solution followed by ultrasonically washing three times in deionized water and anhydrous ethanol respectively, and then dried naturally in air for later use. The anode substrate NiFe-LDH/NF was prepared according to the same method in example 1.

(2) The parameter of magnetron sputtering was set as 150 W/cm$^2$, the sputtering time was 2 min, and the vacuum degree of a vacuum cavity was adjusted to 0.3-5 pa.

(3) The dried NiFe-LDH/NF electrode sheet suspended in the vacuum cavity to undergo magnetron sputtering for 2 min according to parameters including the power of 150 W/cm$^2$ and sputtering of 2 min to obtain a Ag@NiFe-LDH/NF oxygen evolution anode.

(4) 40 g of sodium hydroxide and 146.1 g of sodium chloride solid were weighed and dissolved into 1 L of deionized water to prepare a 1 M NaOH+2.5 M NaCl high-concentration simulated seawater solution as an electrolyte solution for later use.

Figure 9:
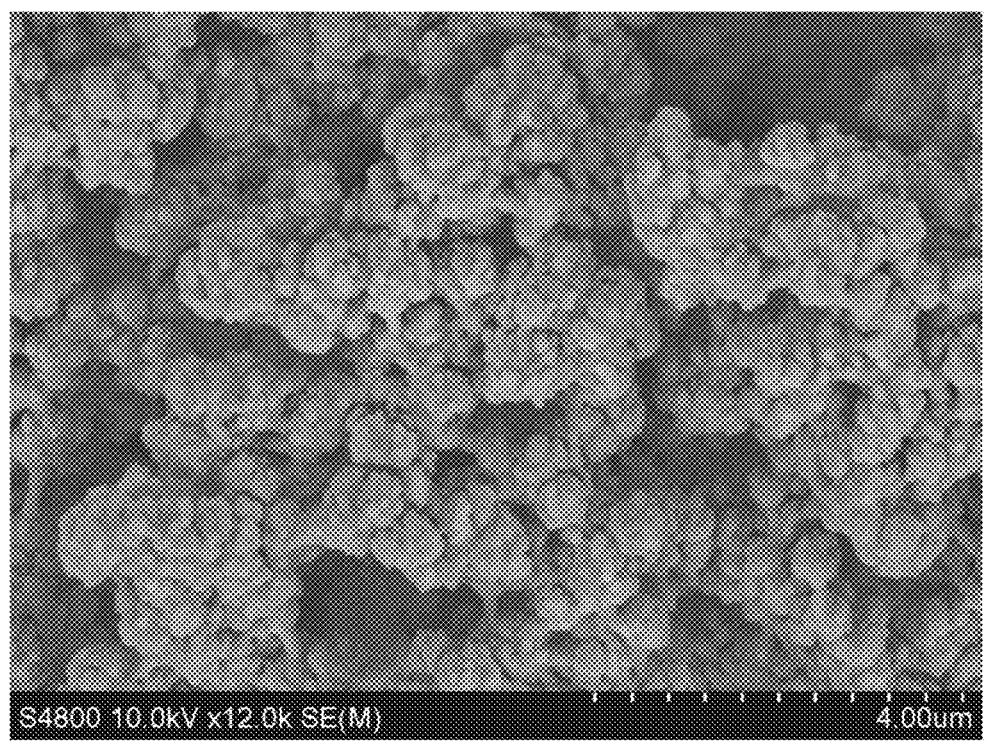
FIG. 9 is a scanning electron microscope picture of a surface morphology of an anode for hydrogen production via electrolysis according to a typical comparative example of the present application.

(5) The stability of Ag@NiFe-LDH/NF was tested under the current density of 200 mA/cm$^2$ by using Ag@NiFe-LDH/NF prepared in step (3) as a working electrode, a platinum sheet as a pair electrode and high-concentration simulated seawater in step (4) as an electrolyte. The SEM picture is shown in FIG. 9.

This comparative example is substantially similar to example 2, only except that the process parameters of magnetron sputtering are different, and a continuous layer structure formed during the traditional electroplating is formed rather than the above particular silver nano layer structure.

Therefore, the stability of the anode prepared by this method only lasts for about 4 hours, which is far lower than that under the optimal condition.

Based on the above example, it can be clarified that the method provided in the present application makes the surface of the anode more resistant to chloride ions and can better protect the electrode, thereby significantly delaying the corrosion of chloride ions on the substrate and the catalyst in seawater electrolysis. The prepared Ag@NiFe-LDH/NF catalyst anode has excellent stability in chlorine ion-containing aqueous solution, especially in hydrogen production reaction via electrolysis in seawater. In the present application, the NiFe-LDH/NF oxygen evolution catalyst densely coated onto the conductive substrate is prepared through a simple hydrothermal method, is used for electroplating/magnetron sputtering/electroless plating of the silver layer, and has the advantage of low cost due to use of a non-notable metal as a catalyst metal source. The Ag@NiFe-LDH/NF electrolysis alkaline seawater oxygen evolution catalyst prepared in this method can effectively prevent the corrosion of chlorine ions in seawater on the conductive substrate, and has excellent stability in oxygen evolution reaction via catalytic seawater electrolysis.

It should be understood that the above embodiments are only for illustrating the technical concept and features of the present application for the purpose of rendering those skilled in the art to understand the content of the present application and whereby limit the protective scope of the present application. Equivalent variations or modifications made according to the spirit essence of the present application should be included within the protective scope of the present invention.

What is claimed is:

1. A modification method of an anode for hydrogen production via electrolysis, comprising:
    providing an anode substrate which can be used for hydrogen production via catalytic electrolysis and comprises a combination of any one or more than two of hydroxides, oxides, phosphides, and sulfides;
    depositing a plurality of silver nano particles on the active surface of an anode substrate by using any one of an electroplating method, an electroless plating method, and a vapor plating method to form a silver nano layer, wherein gaps are present among the silver nano particles, and a part of the active surface is exposed from the gaps, and the particle size of the silver nano particle is 10-30 nm, the size of each gap is 100-300 nm, and the surface density of the silver nano particle in the silver nano layer is 200-500/μm$^2$;
    wherein, an electroplating solution used in the electroplating method comprises a silver salt, a complexing agent and an alkaline substance; the silver salt comprises silver nitrate; the concentration of the silver salt in the electroplating solution is 0.01-0.06 mol/L, the complexing agent comprises a combination of any one or two of sodium pyrophosphate or potassium pyrophosphate, the concentration of the complexing agent in the electroplating solution is 0.05-0.20 mol/L, the alkaline substance comprises sodium hydroxide or potassium hydroxide, the concentration of the alkaline substance in the electroplating solution is 0.2-1.0 mol/L; the current density used in the electroplating method is 3-10 mA/cm$^2$; the electroplating method is a constant current mode, the electroplating time is 3-15 min, and the electroplating temperature is 20-30° C.;

the electroless plating temperature is 20-25° C., the electroless plating time is 5-10 minutes, the electroless plating solution used in the electroless plating method comprises a silver salt, a reducing agent and a stabilizer, the silver salt in the electroless plating solution comprises a combination of any one or two of silver sulfate and silver nitrate, the reducing agent comprises a combination of any one or two of glucose and sodium borohydride, and the stabilizer comprises a combination of any one or more than two of tartaric acid, ammonia and the sodium hydroxide, the concentration of the silver salt in the electroless planting solution is 0.01-0.1 mol/L, the concentration of the reducing agent is 0.1-0.5 mol/L, and the concentration of the stabilizer is 0.2-0.6 mol/L; and the vapor plating method is done using magnetron sputtering, the power density of the magnetron sputtering is 150-250 W/cm$^2$, and the time of the magnetron sputtering is 10-50 s.

2. A method of hydrogen production using a modified anode modified according to the modification method of claim 1, comprising a step of performing electrolysis in a chlorine ion-containing aqueous solution with the modified anode.

3. The method according to claim 2, wherein the chlorine ion-containing aqueous solution comprises seawater.

4. The method according to claim 2, wherein the thickness of the silver nano layer is 5-20 nm.

* * * * *